US012657166B1

(12) United States Patent
Goetz et al.

(10) Patent No.: US 12,657,166 B1
(45) Date of Patent: Jun. 16, 2026

(54) MULTI-TABLE AND MULTI-QUERY TRANSACTIONS IN DATA LAKEHOUSES

(71) Applicant: SAP SE, Walldorf (DE)

(72) Inventors: Tobias Goetz, Garching (DE); Daniel Ritter, Heidelberg (DE); Jana Gicheva Makreshanska, Munich (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/978,925

(22) Filed: Dec. 12, 2024

(51) Int. Cl.
　　*G06F 16/18*　　(2019.01)
　　*G06F 16/11*　　(2019.01)

(52) U.S. Cl.
　　CPC ........ *G06F 16/1865* (2019.01); *G06F 16/128* (2019.01); *G06F 16/1873* (2019.01)

(58) Field of Classification Search
　　CPC . G06F 16/1865; G06F 16/1873; G06F 16/128
　　See application file for complete search history.

(56) References Cited

U.S. PATENT DOCUMENTS

| | | | | |
|---|---|---|---|---|
| 5,287,501 A | * | 2/1994 | Lomet ................. | G06F 11/1474 |
| | | | | 707/648 |
| 12,135,700 B1 | * | 11/2024 | Dharamshi ......... | G06F 16/2219 |
| 12,475,126 B1 | * | 11/2025 | Coutts ............... | G06F 16/24545 |
| 2003/0208464 A1 | * | 11/2003 | Lee ..................... | G06F 16/2358 |
| 2022/0188447 A1 | | 6/2022 | Braghin et al. | |
| 2025/0371029 A1 | * | 12/2025 | Bourbonnais ......... | G06F 16/254 |

FOREIGN PATENT DOCUMENTS

| | | |
|---|---|---|
| CN | 116028514 A | 4/2023 |

OTHER PUBLICATIONS

Afroozeh, A. et al. "The fastlanes compression layout: Decoding> 100 billion integers per second with scalar code." Proceedings of the VLDB Endowment 16.9 (2023): 2132-2144.

Agiwal, A. et al. "Napa: Powering scalable data warehousing with robust query performance at Google." Proceedings of the VLDB Endowment 14.12 (2021): 2986-2997.

Ait Errami, S. et al. "Spatial big data architecture: from data warehouses and data lakes to the Lakehouse." Journal of Parallel and Distributed Computing 176 (2023): 70-79.

Amazon Web Services. Amazon Redshift Spectrum adds support for querying open source Apache Hudi and Delta Lake. (Available at https://aws.amazon. com/about-aws/whats-new/2020/09/ amazon-redshift-spectrum-adds-support-for-querying-open-source-apache-hudi-and-delta-lake/), 1 page.

(Continued)

*Primary Examiner* — Loc Tran
(74) *Attorney, Agent, or Firm* — Mintz Levin Cohn Ferris Glovsky and Popeo, P.C.

(57) ABSTRACT

A transaction which targets an object store employing an open table format (OTF) may be detected by a database execution engine. Next, the database execution engine performs a determination step to determine which OTF enhancement levels to apply to the detected transaction. Then, the database execution engine applies one or more OTF enhancement levels to the transaction based on the determination step. Next, the database execution engine causes the transaction to be processed with the applied one or more OTF enhancement levels. Then, the database execution engine returns a result of the transaction processing to a computing device.

14 Claims, 13 Drawing Sheets

(56)         References Cited

OTHER PUBLICATIONS

Amazon Web Services. Cloud Object Storage—Amazon S3—AWS. (Available at https://aws.amazon.com/s3/), 4 pages.
Amazon Web Services. Amazon S3 Strong Consistency. (Available at https://aws.amazon.com/s3/ consistency/), 4 pages.
Amazon Web Services. AWS SDK for C++. (Available at https://aws.amazon.com /sdk-for-cpp/), 2 pages.
Apache 2.0 license. Project Nessie: Transactional Catalog for Data Lakes with Git-like semantics. (Available at https://github.com/ projectnessie/ nessie?tab=readme-ov-file), 7 pages.
Apache Parquet. Parquet. (Available at https://parquet.apache.org/), 3 pages.
Apache XTable. Apache XTable (Incubating). (Available at https:// xtable.apache.org/), 4 pages.
Armbrust, M. et al. "Delta lake: high-performance ACID table storage over cloud object stores." Proceedings of the VLDB Endowment 13.12 (2020): 3411-3424.
Armbrust, M. et al. "Lakehouse: a new generation of open platforms that unify data warehousing and advanced analytics." In Proceedings of CIDR 2021, Virtual Event, Jan. 11-15, 2021, Online Proceedings.
Armenatzoglou, N. et al. "Amazon Redshift re-invented." Proceedings of the 2022 International Conference on Management of Data. 2022.
Begoli, E. et al. "A Lakehouse Architecture for the Management and Analysis of Heterogeneous Data for Biomedical Research and Mega-biobanks."
Behm, A. et al. "Photon: A fast query engine for lakehouse systems." Proceedings of the 2022 International Conference on Management of Data. 2022: 2326-2339.
Bernstein P.A. et al. 1987. Concurrency Control and Recovery in Database Systems. Addison-Wesley. (Available at https://www. microsoft.com/en-us/research/people/philbe/book/).
Bernstein, P.A. et al. "Multiversion concurrency control—theory and algorithms." ACM Transactions on Database Systems (TODS) 8.4 (1983): 465-483.
Bernstein, P. A., et al. "Optimistic concurrency control by melding trees." Proceedings of the VLDB Endowment 4.11 (2011): 944-955.
Chen, Z. et al. "Policy-based access control system for delta lake." 2022 Tenth International Conference on Advanced Cloud and Big Data (CBD). IEEE, 2022.
Cooper, B. F. et al. "Benchmarking cloud serving systems with YCSB." In Proceedings of the 1st ACM symposium on Cloud computing: Jun. 10-11, 2010, 143-154.
Durner, D. et al. "Exploiting cloud object storage for high-performance analytics." Proceedings of the VLDB Endowment 16.11 (2023): 2769-2782.
Garcia-Molina, H. et al. "Sagas." ACM Sigmod Record 16.3 (1987): 249-259.
Gartner Inc. "Gartner Says Cloud Will Become a Business Necessity by 2028." (Available at https://www.gartner.com /en/newsroom/ press- releases/ 2023-11-29-gartner-says-cloud-will-become-a-business-necessity-by-2028), 3 pages.
Ghita, B. et al. "White-box Compression: Learning and Exploiting Compact Table Representations." CIDR. vol. 1. 2020.
Google. Create BigLake external tables for Delta Lake. (Available at https://cloud.google.com/bigquery/docs/create-delta-lake-table), 6 pages.
Goswamia A. et al. "Build a high-performance, transactional data lake using open-source Delta Lake on Amazon EMT." (Available at https://aws.amazon.com/blogs/big-data/build-a-high-performance-transactional-data-lake-using-open-source-delta-lake-on-amazon-emr/), 12 pages.
Haas, G. et al. "What modern NVMe storage can do, and how to exploit it: High-performance I/O for high-performance storage engines." Proceedings of the VLDB Endowment 16.9 (2023): 2090-2102.
Hambardzumyan, S. et al. "Deep lake: A lakehouse for deep learning."

Iwabuchi, K. et al. "Towards a distributed large-scale dynamic graph data store." 2016 IEEE International Parallel and Distributed Processing Symposium Workshops (IPDPSW). IEEE, 2016.
Jain, P. et al. "Analyzing and Comparing Lakehouse Storage Systems." In 13th Conference on Innovative Data Systems Research, CIDR 2023, Amsterdam, The Netherlands, Jan. 8-11, 2023.
Kraft, P. et al. "Epoxy: Acid transactions across diverse data stores." Proceedings of the VLDB Endowment 16.11 (2023): 2742-2754.
Kuschewski, M. et al. "Btrblocks: Efficient columnar compression for data lakes." Proceedings of the ACM on Management of Data 1.2 (2023): 1-26.
Lee, D. et al. "Elastic use of far memory for in-memory database management systems." Proceedings of the 19th International Workshop on Data Management on New Hardware. 2023.
Levandoski, J. et al. "BigLake: BigQuery's Evolution toward a Multi-Cloud Lakehouse." Companion of the 2024 International Conference on Management of Data. 2024.
Liu, Z. H. et al. "Native JSON datatype support: maturing SQL and NoSQL convergence in Oracle database." Proceedings of the VLDB Endowment 13.12 (2020): 3059-3071.
Madden, S. et al. "Self-Organizing Data Containers." In 12th Conference on Innovative Data Systems Research, CIDR 2022, Chaminade, CA, USA, Jan. 9-12, 2022.
Mohan, C., et al. "Aries." ACM Transactions on Database Systems 17.1 (1992): 94-162.
Mueller, I. et al. "Lambda: Interactive Data Analytics on Cold Data Using Serverless Cloud Infrastructure." Conference on Management of Data (SIGMOD'20). 2020, 115-130.
Neumann, T. et al. "Fast serializable multi-version concurrency control for main-memory database systems." Proceedings of the 2015 ACM SIGMOD International Conference on Management of Data. 2015, 677-689.
Perron, M. et al. "Starling: A scalable query engine on cloud functions." Proceedings of the 2020 ACM SIGMOD International Conference on Management of Data. 2020, 131-141.
Ren, J. et al. GitHub—basicthinker/YCSB-C: Yahoo! Cloud Serving Benchmark in C++, a C++ version of YCSB. (Available at https://github.com/basicthinker/YCSB-C?tab=readme-ov-file#readme), 1 page.
Rey, A. "Bridging the Gap between Data Lakes and RDBMSs." (2024). In Proceedings of the Workshops of the EDBT/ICDT 2024 Joint Conference co-located with the EDBT/ICDT 2024 Joint Conference, Paestum, Italy, Mar. 25, 2024 (CEUR Workshop Proceedings), Themis Palpanas and H. V. Jagadish (Eds.), vol. 3651.
Rey, A. et al. "Seamless Integration of Parquet Files into Data Processing." BTW 2023. Gesellschaft für Informatik eV, 2023, 235-258.
Ritter, D. "Cost-aware process modeling in multiclouds." Information Systems 108 (2022): 101969.
SAP SE. SAP S4/HANA—About. (Available at https://api.sap.com/ products/SAPS4HANA/overview), 1 page.
SAP SE. SAP Sales Cloud. (Available at https://www.sap.com/uk/ products/crm/sales-cloud.html), 2 pages.
SAP SE. What is Ariba? (Available at https://www.sap.com/products/ acquired-brands/what-is-ariba.html), 2 pages.
Sarrel, M. "Strict Consistency is a Hard Requirement for Primary Storage." (Available at https://blog.min.io/strict- consistency-hard-requirement-for-primary-storage/) 8 pages.
Schmidt, T. et al. "Predicate caching: Query-driven secondary indexing for cloud data warehouses." Companion of the 2024 International Conference on Management of Data. 2024, 347-359.
Sethi, R. et al. "Presto: SQL on everything." 2019 IEEE 35th International Conference on Data Engineering (ICDE). IEEE, 2019.
Snowflake. Apache Iceberg tables I Snowflake Documentation. (Available at https://docs.snowflake.com/en/user-guide/tables-iceberg), 9 pages.
Suminto, R. "12 Times Faster Query Planning with Iceberg Manifest Caching in Impala." (Available at https://blog. cloudera.com/ 12-times-faster- query-planning-with-iceberg-manifest-caching-in-impala/), 5 pages.
The Apache Software Foundation. Apache Arrow I Apache Arrow. (Available at https://arrow.apache.org /overview/), 2 pages.

(56)  References Cited

OTHER PUBLICATIONS

The Apache Software Foundation. Apache Iceberg—Apache Iceberg. (Available at https://iceberg.apache. org/), 2 pages.

The Apache Software Foundation. Apache ORC—High-Performance Columnar Storage for Hadoop. (Available at https://orc. apache.org/), 1 page.

The Apache Software Foundation. Apache Spark—Unified Engine for large-scale data analytics. (Available at https://spark.apache.org/), 4 pages.

The Apache Software Foundation. Concurrency Control I Apache Hudi. (Available at https://hudi.apache. org/ docs/concurrency_control/), 13 Pages.

The Apache Software Foundation. GitHub Apache Iceberg. (Available at https://github.com/apache/ iceberg/), 5 pages.

The Apache Software Foundation. Hello from Apache Hudi I Apache Hudi. (Available at https://hudi. apache.org/docs/overview/), 3 pages.

The Apache Software Foundation. MinIO. (Available at https://min.io/), 9 pages.

The Apache Software Foundation. Nessie—Apache Iceberg. (Available at https://iceberg.apache.org /docs/1.7.2/nessie/), 4 pages.

The Apache Software Foundation. Reliability—Apache Iceberg. (Available at https://iceberg.apache.org/ docs/1.4.1/reliability/), 2 pages.

The Apache Software Foundation. Overview—Spark 3.5.0 Documentation. (Available at https://spark.apache.org /docs/3.5.0/), 3 pages.

The Apache Software Foundation. Spec—Apache Iceberg. (Available at https://iceberg.apache.org/spec/), 48 pages.

The Linux Foundation Projects. Home I Delta Lake. (Available at https://delta.io/), 3 pages.

The Linux Foundation Projects. Introduction—Delta Lake Documentation. (Availabe at https://docs.delta.io/latest/delta-intro.html), 1 page.

THL A29 Limited and Milo Yip. RapidJSON: Main Page. (Available at https://rapidjson.org/), 5 pages.

Trino Software Foundation. Trino I Distributed SQL query engine for big data. (Available at https://trino.io/)< 3 pages.

Van Renen, AA. "Cloud analytics benchmark." Proceedings of the VLDB Endowment 16.6 (2023): 1413-1425.

Vohra, D. "Apache parquet." Practical Hadoop Ecosystem: A Definitive Guide to Hadoop-Related Frameworks and Tools. Berkeley, CA: Apress, 2016. 325-335.

Vuppalapati, M. et al. "Building an elastic query engine on disaggregated storage." 17th USENIX Symposium on Networked Systems Design and Implementation (NSDI 20). 2020, 449-462.

Winter, C. et al. "On-demand state separation for cloud data warehousing." Proceedings of the VLDB Endowment 15.11 (2022): 2966-2979.

Zaharia, M. et al. "Spark: Cluster computing with working sets." 2nd USENIX workshop on hot topics in cloud computing (HotCloud 10). 2010.

Extended European Search Report issued in co-pending European Application No. 25210195.1-1207 mailed Feb. 19, 2026, 12 pages.

* cited by examiner (a) Iceberg Table (explicit design) (b) Delta Table (implicit design)

(b) Delta Lake Integration (a) Apache Iceberg Integration (a) Physical (b) Logical

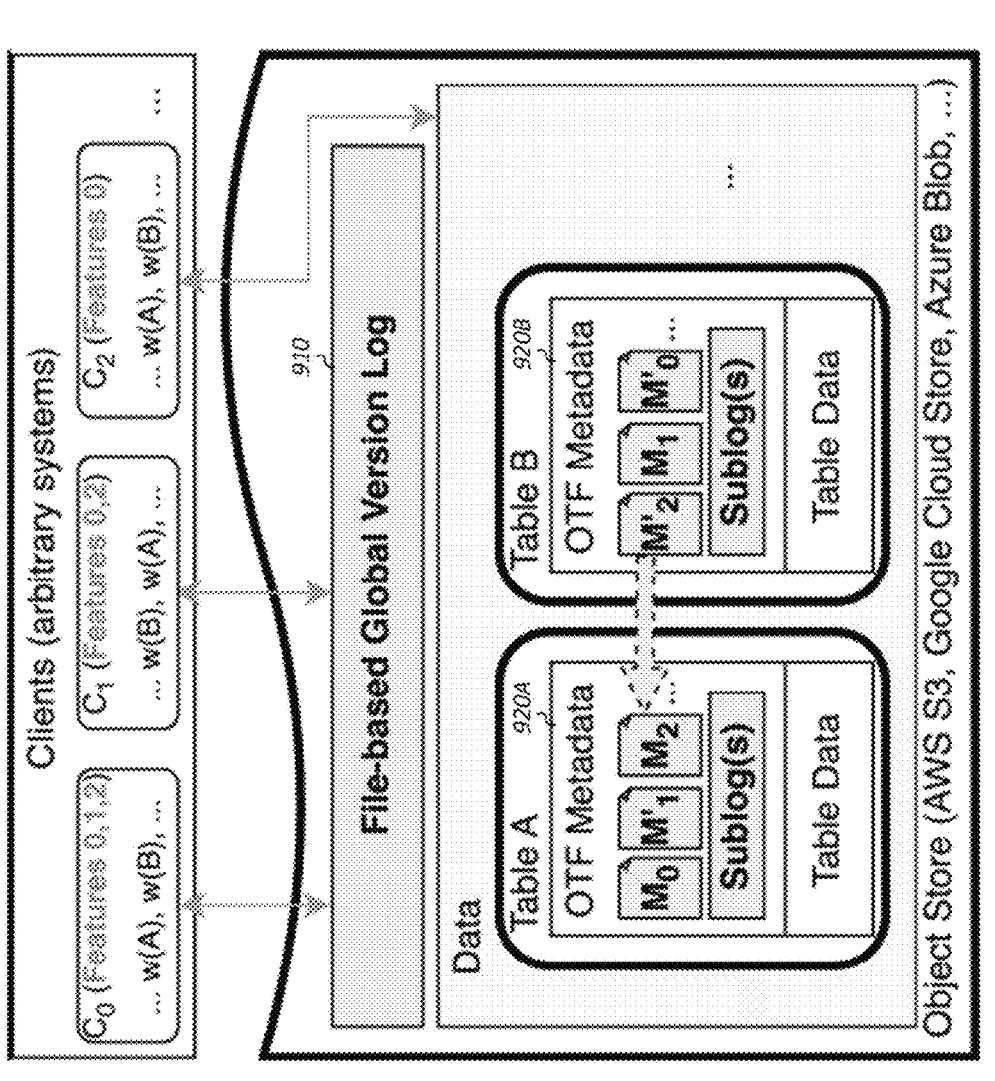
*FIG. 9*

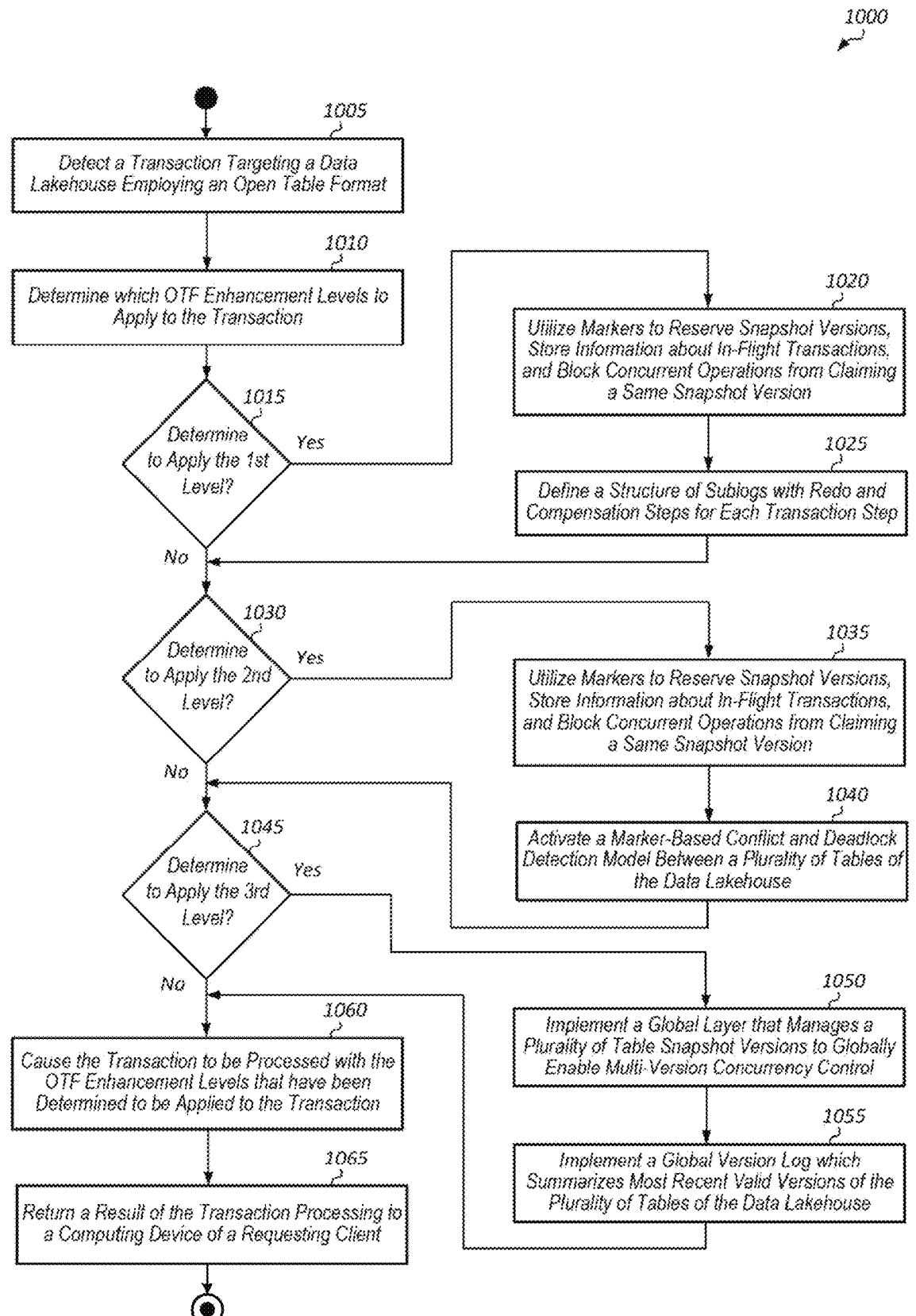

*1000*

*1005*
Detect a Transaction Targeting a Data Lakehouse Employing an Open Table Format

*1010*
Determine which OTF Enhancement Levels to Apply to the Transaction

*1015*
Determine to Apply the 1st Level?
Yes

*1020*
Utilize Markers to Reserve Snapshot Versions, Store Information about In-Flight Transactions, and Block Concurrent Operations from Claiming a Same Snapshot Version

*1025*
Define a Structure of Sublogs with Redo and Compensation Steps for Each Transaction Step No

*1030*
Determine to Apply the 2nd Level?
Yes

*1035*
Utilize Markers to Reserve Snapshot Versions, Store Information about In-Flight Transactions, and Block Concurrent Operations from Claiming a Same Snapshot Version

*1040*
Activate a Marker-Based Conflict and Deadlock Detection Model Between a Plurality of Tables of the Data Lakehouse No

*1045*
Determine to Apply the 3rd Level?
Yes

*1050*
Implement a Global Layer that Manages a Plurality of Table Snapshot Versions to Globally Enable Multi-Version Concurrency Control

*1055*
Implement a Global Version Log which Summarizes Most Recent Valid Versions of the Plurality of Tables of the Data Lakehouse No

*1060*
Cause the Transaction to be Processed with the OTF Enhancement Levels that have been Determined to be Applied to the Transaction

*1065*
Return a Result of the Transaction Processing to a Computing Device of a Requesting Client

FIG. 10

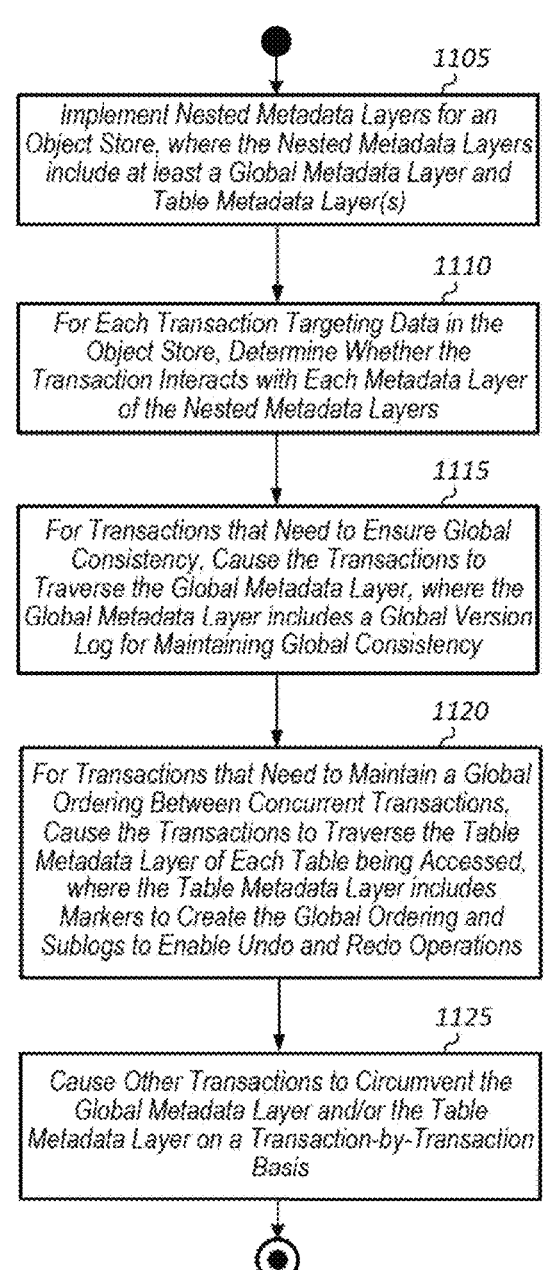

*1100*

*1105*

Implement Nested Metadata Layers for an Object Store, where the Nested Metadata Layers include at least a Global Metadata Layer and Table Metadata Layer(s)

*1110*

For Each Transaction Targeting Data in the Object Store, Determine Whether the Transaction Interacts with Each Metadata Layer of the Nested Metadata Layers

*1115*

For Transactions that Need to Ensure Global Consistency, Cause the Transactions to Traverse the Global Metadata Layer, where the Global Metadata Layer includes a Global Version Log for Maintaining Global Consistency

*1120*

For Transactions that Need to Maintain a Global Ordering Between Concurrent Transactions, Cause the Transactions to Traverse the Table Metadata Layer of Each Table being Accessed, where the Table Metadata Layer includes Markers to Create the Global Ordering and Sublogs to Enable Undo and Redo Operations

*1125*

Cause Other Transactions to Circumvent the Global Metadata Layer and/or the Table Metadata Layer on a Transaction-by-Transaction Basis

*FIG. 11*

MULTI-TABLE AND MULTI-QUERY TRANSACTIONS IN DATA LAKEHOUSES

TECHNICAL FIELD

The present disclosure generally relates to processing database queries in data lakehouses.

BACKGROUND

The past few years have seen the rise of a new type of data management system, called lakehouse (LH), which combines the benefits of low-cost, open-format data lakes and transactional data warehouses on relational data. With the data gravity leading towards data lakes, LHs for analytical query processing became crucial. LHs are used in various applications such as biomedical, deep learning, and analytical business applications. Contributing to this decision is that LHs feature cross-data system vendor interoperability through open formats, their comparably lower economic costs, high throughput, metadata information and reliable data lake storage (e.g., Amazon Web Services (AWS) S3). LHs usually experience a highly concurrent workload of 60% reads and 40% writes from independent applications and sources. Hence, LHs typically feature elastic compute (e.g., Apache Spark, Presto, Trino) for processing data physically stored in data formats like the column-oriented Parquet or Optimized Row Columnar (ORC).

For efficient elastic query processing with relational table semantics and analytical capabilities on the data, open table formats (OTFs) such as Delta Lake tables, Apache Iceberg, or Apache Hudi manage the underlying data through a separate metadata layer on the object store. While an OTF design specifies certain relational Database Management System (DBMS) functionality like transactions for single tables and rows, indexes, and time travel, OTFs have many missing features inherent to their metadata designs, like no support for multi-table transactions and recovery in case of an abort in concurrent, multi-query workloads. This can lead to non-repeatable reads, stale data, and high costs in productive cloud systems.

SUMMARY

In some implementations, a transaction is detected, where the transaction targets an object store employing an open table format (OTF). Next, a database execution engine performs a determination step to determine which OTF enhancement levels to apply to the transaction. Then, the database execution engine applies one or more OTF enhancement levels to the transaction based on the determination step. Next, the database execution engine causes the transaction to be processed with the applied one or more OTF enhancement levels. Then, the database execution engine returns a result of the transaction processing to a computing device.

In an example, a first OTF enhancement level may utilize markers to reserve snapshot versions, store information about in-flight transactions, and block concurrent operations from claiming a same snapshot version. The first OTF enhancement level may also define a structure of sublogs with redo and compensation steps for each transaction step. In this example, a second OTF enhancement level may activate a marker-based conflict and deadlock detection model between a plurality of tables of the targeted database. Still further in this example, a third OTF enhancement level may implement a global layer that manages a plurality of table snapshot versions to globally enable multi-version concurrency control, and the third OTF enhancement level may implement a global version log which summarizes most recent valid versions of the plurality of tables. Each OTF enhancement level may be applied independently of other ones of the plurality of OTF enhancement levels.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 9 illustrates a diagram of an example of a system, in accordance with some example implementations of the current subject matter;

FIG. 10 illustrates a process for determining which levels to apply to a query targeting a data lakehouse, in accordance with some example implementations of the current subject matter;

FIG. 11 illustrates a process for implementing nested metadata layers in an object store, in accordance with some example implementations of the current subject matter;

DETAILED DESCRIPTION

A data lakehouse (LH) is a data platform that combines aspects of data lakes and data warehouses into a single system. A data LH stores large quantities of raw data from a variety of sources while preserving the data's original format. Despite a growing amount of research on LH storage system benchmarking, more efficient data formats, and LH query engines, many missing features of open table formats (OTFs) are not well-studied. Hence, current LH designs impose limitations on the system to avoid missing features of OTFs. This specification focuses on three missing features: OTFs do not support Atomicity, Consistency, Isolation, and Durability (ACID) multi-table and multi-query transactions, only allowing simple business logic (feature (i) Complex Transactions). Further, due to the table focus of OTFs, OTFs cannot guarantee isolation globally at any time, leading to inconsistencies and dirty reads under concurrency (feature (ii) Isolation). Lastly, the conflict resolution of OTFs is not adaptive to concurrent changes, resulting in multiple aborts and higher transaction costs (feature (iii) Recovery).

The existing OTFs and projects provide a crucial basis for analytical workloads, but OTFs can do more with the techniques disclosed herein. This specification introduces LakeVilla, an extension that implements the three missing features (i)-(iii) in composable levels for existing OTF deployments. LakeVilla's levels are integrated into the original protocol such that each transaction can freely choose its required guarantees. LakeVilla can be "correct by construction" by adapting the following techniques for the various missing features: A marker-based conflict and deadlock detection model between all tables in the LH may be employed to support complex transactions (i). Further, to guarantee isolation (ii), a global version log may be implemented that checks global relations between tables and acts as a new global layer on the object store. Lastly, for recovery (iii), logical snapshot version markers may be employed with transaction sublogs and physical and logical undo and redo information to define a greedy transaction model (similar to database logging).

In this specification, missing metadata-related features for LHs are identified and analyzed and a complementary solution to current LH designs called LakeVilla is proposed. The LakeVilla solution introduces effective recovery, multi-query and multi-table transactions, and transaction isolation to current state-of-the-art OTFs like Apache Iceberg and Delta tables, with minimal impact on read performance and full compatibility with the OTFs.

Figure 1:
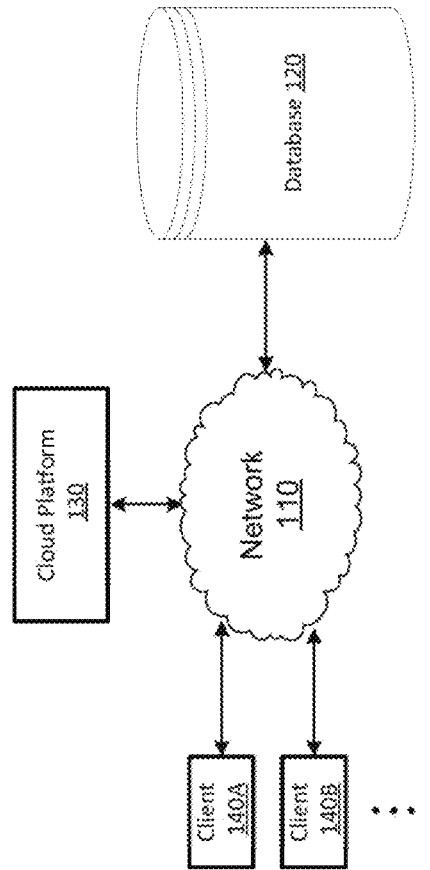
FIG. 1 illustrates a logical diagram of an example of a system, in accordance with some example implementations of the current subject matter.

Referring now to FIG. 1, a diagram illustrating an example of a system 100 is depicted, consistent with implementations of the current subject matter. As shown in FIG. 1, the system 100 may include a cloud platform 130, and cloud platform 130 may provide resources that can be shared among a plurality of tenants. For example, the cloud platform 130 may be configured to provide a variety of services including, for example, software-as-a-service (SaaS), platform-as-a-service (PaaS), infrastructure as a service (IaaS), and/or the like, and these services can be accessed by one or more tenants of the cloud platform 130. In the example of FIG. 1, the system 100 includes a first tenant 140A (labeled client) and a second tenant 140B (labeled client as well), although system 100 may include any number of other tenants. For example, multitenancy enables multiple end-user devices (e.g., a computer including an application) as well as multiple subscribing customers having their own group of end-users with an isolated context of particular customers to access a given cloud service having shared resources via the Internet and/or other type of network 110 or communication link(s).

The cloud platform 130 may include resources, such as at least one computer (e.g., a server), data storage, and a network (including network equipment) that couples the computer(s) and storage. The cloud platform 130 may also include other resources, such as operating systems, hypervisors, and/or other resources, to virtualize physical resources (e.g., via virtual machines) and provide deployment (e.g., via containers) of applications (which provide services, for example, on the cloud platform, and other resources). In the case of cloud platform 130 including and/or being coupled to a "public" cloud platform, the services may be provided on-demand to a client, or tenant, via the Internet. For example, the resources at the public cloud platform may be operated and/or owned by a cloud service provider (e.g., Amazon Web Services, Azure), such that the physical resources at the cloud service provider can be shared by a plurality of tenants. Alternatively, or additionally, the cloud platform 130 may include and/or be coupled to one or more local servers, in which case some of the resources utilized by clients 140A-140B may be hosted on an entity's own private servers (e.g., dedicated corporate servers operated and/or owned by the entity). Alternatively, or additionally, the cloud platform 130 may be considered a "hybrid" platform, which includes and/or is coupled to a combination of on-premises resources as well as resources hosted by a public or private cloud platform. For example, a hybrid platform may include web servers running in a public cloud while application servers and/or databases are hosted on premise (e.g., at an area controlled or operated by the entity, such as a corporate entity).

In various embodiments, the cloud platform 130 provides services to client 140A-B. Each service may be deployed via a container, which provides a package or bundle of software, libraries, and configuration data to enable the cloud platform to deploy during runtime the service to, for example, one or more virtual machines that provide the service to client 140A. The service may also include logic (e.g., instructions that provide one or more steps of a process) and an interface. The interface may be implemented as an Open Data Protocol (OData) interface (e.g., HTTP message may be used to create a query to a resource identified via a URI), although the interface may be implemented with other types of protocols including those in accordance with REST (Representational state transfer). In the example of FIG. 1, an external REST type call may be used to send queries and receive responses from database 120.

Figure 2:
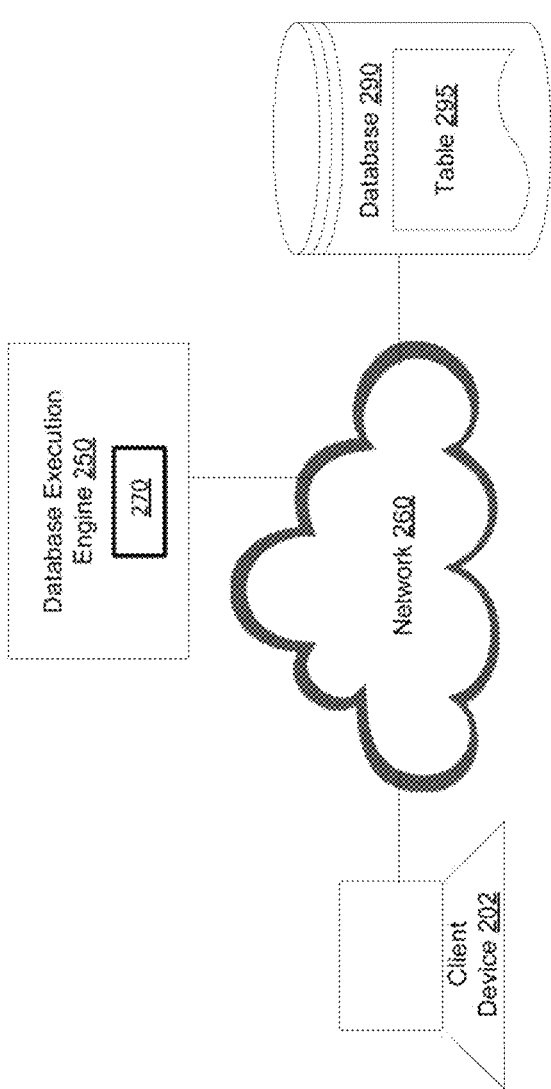
FIG. 2 illustrates a block diagram of an example of a system, in accordance with some example implementations of the current subject matter.

Turning now to FIG. 2, a system diagram illustrating an example of a database system 200 is shown, in accordance with one or more embodiments of the current subject matter. Referring to FIG. 2, the database system 200 may include one or more client devices 202, a database execution engine 250, and one or more databases 290. As shown in FIG. 2, the one or more client devices 202, the database execution engine 250, and the one or more databases 290 may be communicatively coupled via a network 260. The one or more databases 290 may include a variety of relational databases including, for example, an in-memory database, a column-based database, a row-based database, and/or the like. The database execution engine 250 may access a database table 295 stored at the one or more databases 290, with the database table 295 representative of any number and type of tables.

In some example embodiments, the one or more databases 290 may include a relational database. However, it should be appreciated that the one or more databases 290 may include any type of database including, for example, an in-memory database, a hierarchical database, an object database, an object-relational database, and/or the like. For example, instead of and/or in addition to including a relational database, the one or more databases 290 may include a graph database, a column store, a key-value store, a document store, and/or the like.

The one or more client devices 202 may include processor-based devices including, for example, a mobile device, a wearable apparatus, a personal computer, a workstation, an Internet-of-Things (IoT) appliance, and/or the like. The network 260 may be a wired network and/or wireless network including, for example, a public land mobile network (PLMN), a local area network (LAN), a virtual local area network (VLAN), a wide area network (WAN), the Internet, and/or the like.

To illustrate by way of an example, a given client device 202 may send a query via the database execution engine 250 to the database layer including the one or more databases 290, which may represent a persistence and/or storage layer where database tables may be stored and/or queried. Furthermore, the database execution engine 250 may provide the ability to access table storage via an abstract interface to a table adapter, which may reduce dependencies on specific types of storage and persistence layers, which may in turn enable use with different types of storage and persistence layers.

The database execution engine 250 may be configured to handle different types of databases and the corresponding persistent layers and/or tables therein. The database execution engine 250 may perform operations including rule-based operations, such as joins and projections, as well as filtering, group by, multidimensional analysis, and/or the like in such a manner so as to reduce the processing burden on the database layer. In this way, the database execution engine 250 may execute these and other complex operations, while the one or more databases 290 can perform simpler operations to reduce the processing burden at the one or more databases 290.

In an example, database execution engine 250 includes control unit 270 for determining which open table format (OTF) enhancement levels to apply to queries targeting the one or more databases 290. It is noted that control unit 270 may be implemented using any suitable combination of hardware (e.g., processing units, programmable logic, application-specific integrated circuits) and software (e.g., program instructions). In an example, the OTF enhancement levels include a first OTF enhancement level which utilizes markers to reserve snapshot versions, store information about in-flight transactions, and block concurrent operations from claiming a same snapshot version. The first OTF enhancement level also defines a structure of sublogs with redo and compensation steps for each transaction step. The OTF enhancement levels also include a second OTF enhancement level which utilizes markers to reserve snapshot versions, store information about in-flight transactions, and block concurrent operations from claiming a same snapshot version. The second OTF enhancement level also activates a marker-based conflict and deadlock detection model between a plurality of tables of the database 290. The OTF enhancement levels also include a third OTF enhancement level which implements a global layer that manages a plurality of table snapshot versions to globally enable multi-version concurrency control. The third OTF enhancement level also implements a global version log which summarizes most recent valid versions of the plurality of tables. In other embodiments, other numbers of OTF enhancement levels may be employed and/or the functionality may be partitioned in other suitable ways among the various OTF enhancement levels. More details on the OTF enhancement levels will be provided throughout the remainder of this disclosure.

Figure 3:
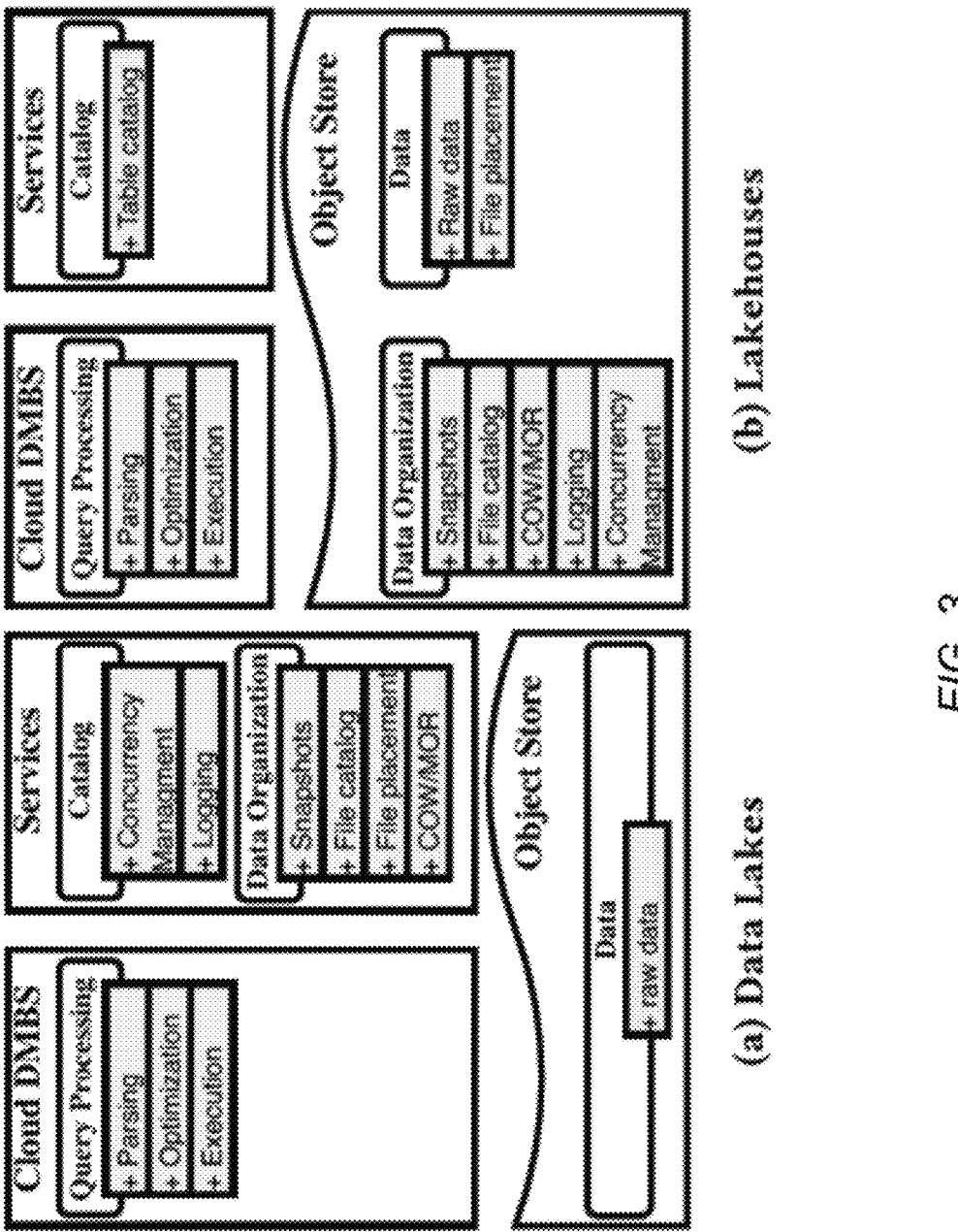
FIG. 3 illustrates examples of Data Lakes and Lakehouse architectures, in accordance with some example implementations of the current subject matter.

Referring now to FIG. 3, examples of Data Lakes and Lakehouse architectures are depicted, in accordance with one or more embodiments of the current subject matter. Lakehouses (LHs) are an evolution from Data Lakes. LH architectures enable efficient processing of structured data in object stores using a query engine. FIG. 3 gives a simplified overview of the different responsibilities of each part of the two architectures. In contrast to Data Lakes (FIG. 3*a*), LHs move data organization (e. g., data placement, version assignment) from external services to the object store (FIG. 3*b*).

The typical use cases of LHs are machine learning and analytical applications with concurrent writes from various data sources with different requirements. Initial load sizes into the object storage may be between multiple GBs up to single digit TB sizes. Workloads tend to have ingestion rates of mostly triple-digit number of thousands of kB to MB-sized events per hour and complex analytical queries with up to double-digit to triple-digit concurrent users. The required data freshness guarantees lie between a few seconds to daily. Through LHs, analytical applications aim for comparably lower storage costs in data lakes while maintaining reasonable performance at the cost of data freshness. Hence, LH features should suit such mixed workloads while working around the object store's reliance on immutable files. Existing techniques from other areas cannot be trivially applied without adaption to those characteristics.

Open table formats (OTFs) on the object store are at the core of LH architectures. Those formats add a separate metadata layer for each table on the object store, organizing data and controlling concurrency from different clients. This enables advanced analytical features globally, easy adaption, provides structure, and is completely built on open-source formats. However, despite the different metadata layer designs of OTFs, all formats are missing the same features: recovery, complex transactions, and isolation.

Recovery: Reducing Duplicate Work on Aborts. All OTFs define a single table-level synchronization point in their metadata layers in the form of appending logs or branches to enable optimistic concurrency control. Hence, a transaction can only be committed if it successfully passes this bottleneck. All transactions based on the same accessed branch/log must abort as the new commit might have accessed the same data. However, OTFs do not provide any means to recover or undo a failed transaction. This can result in unreferenced files, additional costs, and high latency. Redoing the transaction results in redundant work in the form of additional requests to the object store, especially uploading duplicate data files. The impact of this missing feature can intensify for more complex operations as they might starve with the standard OTF concurrency control.

Complex transactions: multi-query and multi-table transactions. The OTF design decision to focus on single-query and single-table transactions led to publishing each operation/sub-operation after its execution (a) and a table-level design (b) of the metadata. (a) breaks the ACID guarantees for multi-query transactions: When simply applying the current designs, intermediate changes of multi-query transactions would become immediately visible (atomicity) and could get overwritten by other concurrent transactions (consistency, isolation). Further, (b) prevents multi-table transactions: An abort in one table could lead to a partially committed transaction (consistency) that cannot be undone without potentially aborting newer transactions or deleting committed values (durability, chance of cascading aborts). Hence, current uses must either break isolation or risk starvation of complex queries for complex transactions.

Isolation: Controlling global versions. Due to the independent metadata layers in OTFs, multi-table transactions must interact with the metadata layer of each table separately. This design decision ignores any global information about the tables' states and dependencies, assigning versions on the table level. Under concurrency, other transactions might observe an inconsistent combination of table versions (dirty read), as some tables might adapt changes of another transaction earlier than others. Most prominently, LHs cannot prevent read transactions from observing potentially partially committed multi-table transactions even with the restriction to a single writer. A global lock can solve the problem but reduces the LH's throughput due to partially enforcing sequential execution. As concurrent reads are the dominant workload of LHs, it becomes essential to guarantee transaction isolation of read and write transactions.

Figure 4:
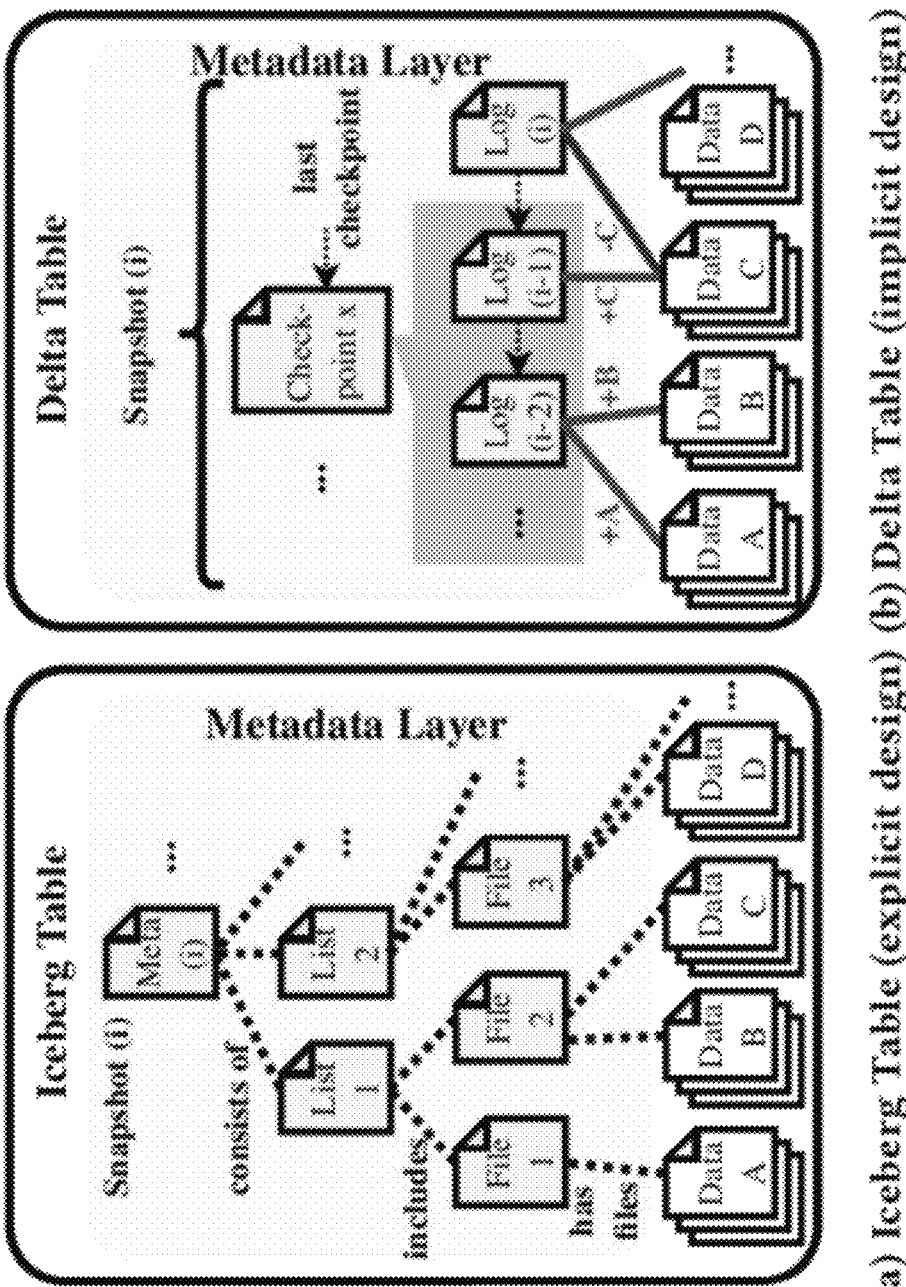
FIG. 4 illustrates examples of Metadata Layer designs of Iceberg Tables and Delta Lake Tables, in accordance with some example implementations of the current subject matter.

Referring now to FIG. 4, examples of Metadata Layer designs of Iceberg Tables and Delta Lake Tables are depicted, in accordance with one or more embodiments of the current subject matter. All OTFs essentially add a separate metadata layer on the object store for each table. By default, when a system accesses the table, it reads and updates the metadata layer to determine and set a consistent version. Hence, metadata layers are essential to the design of OTFs and the biggest difference from previous architectures.

The Apache Iceberg metadata layer design in FIG. 4*a* shows that all snapshots are defined by a top-down structure of files with a metadata file on top. This metadata file contains statistics about each snapshot and redirections to specific manifest lists. In FIG. 4*a*, snapshot (i) is defined by metadata file 'Meta (i)', which redirects to manifest lists 'List 1', 'List 2', and others. Each manifest list depicts specific sections of the table, defined by manifest files with additional statistical information. FIG. 4*a* showcases manifest list 'List 1', which includes the manifest files 'File 1' and 'File 2', while 'List 2' contains manifest files 'File 3' and more. A reference to individual data files and more precise statistics are given in each manifest file. By assembling all information from all manifest files, the actual table data is fully defined. FIG. 4*a* displays manifest files 'File 1' and 'File 2' pointing to the data A, B, and C. Furthermore, data D and more files are included in 'File 3'. This design requires a client to access this layer top-down to retrieve a full data list and create a new snapshot bottom-up by adding and overwriting files in the tree. Any write operation creates its respective data files and only links up-to-date manifest files in its subtree to create its snapshot version. As an Iceberg metadata layer returns an explicit list for a given snapshot, this design may be categorized as an explicit design.

The design of a Delta Table metadata layer is depicted in FIG. 4*b*. A snapshot is defined by its respective log file and all its preceding checkpoints and log files. A single log file contains all file operations to advance the previous snapshot to its own. These operations range from adding or removing files to adding metadata. FIG. 4*b* shows logs (i), (i−1), and log (i−2), each defining their own snapshot. Logs (i−2) and (i−1) add the data regions A, B, and C, while Log (i) removes region C and adds other files. Thus, the snapshot (i) contains regions A, B, and other data but not C and D. Delta Lake avoids sequential accesses to all logs with a pointer to the last checkpoint created, usually stored in a separate file, and a checkpoint stored in parquet format. A checkpoint summarizes all valid table instructions and snapshots at the time of its creation. In FIG. 4*b*, the last checkpoint is 'Checkpoint x' and contains the instructions of logs (i−1), (i−2), and all preceding logs and checkpoints. Hence, a client must only read 'Checkpoint x' and 'Log (i)' to retrieve snapshot (i).

To retrieve the newest snapshot, the client issues a LIST request on the metadata directory and determines the requested snapshot based on the logs keys. Afterward, the client accesses the files and applies the listed operations sequentially to find a consistent table state. In contrast, updating the table is done by appending a new log file to the log directory and eventually creating a new checkpoint. Due to the design logging instructions instead of explicit file lists, Delta Tables may be classified as an implicit design.

Within this specification, multiple techniques are proposed to enable multi-table and multi-query transactions in data lakehouses (LHs). The first of these techniques, Technique #1, employs markers within OTF metadata layers to prevent the starvation of transactions. For LHs, markers reserve a snapshot version during their transactions' execution and thus block concurrent operations from claiming the same version. The marker conversion process converts them to an actual part of the OTF metadata layer during the commit. In addition, a marker aids recovery by storing information about in-flight transactions. Due to the mixed workloads common in LHs, a marker appears empty to LH clients like Spark or Trino to integrate seamlessly into existing architectures with OTFs. The markers' effect can be compared to pessimistic locking and tombstones.

Figure 5:
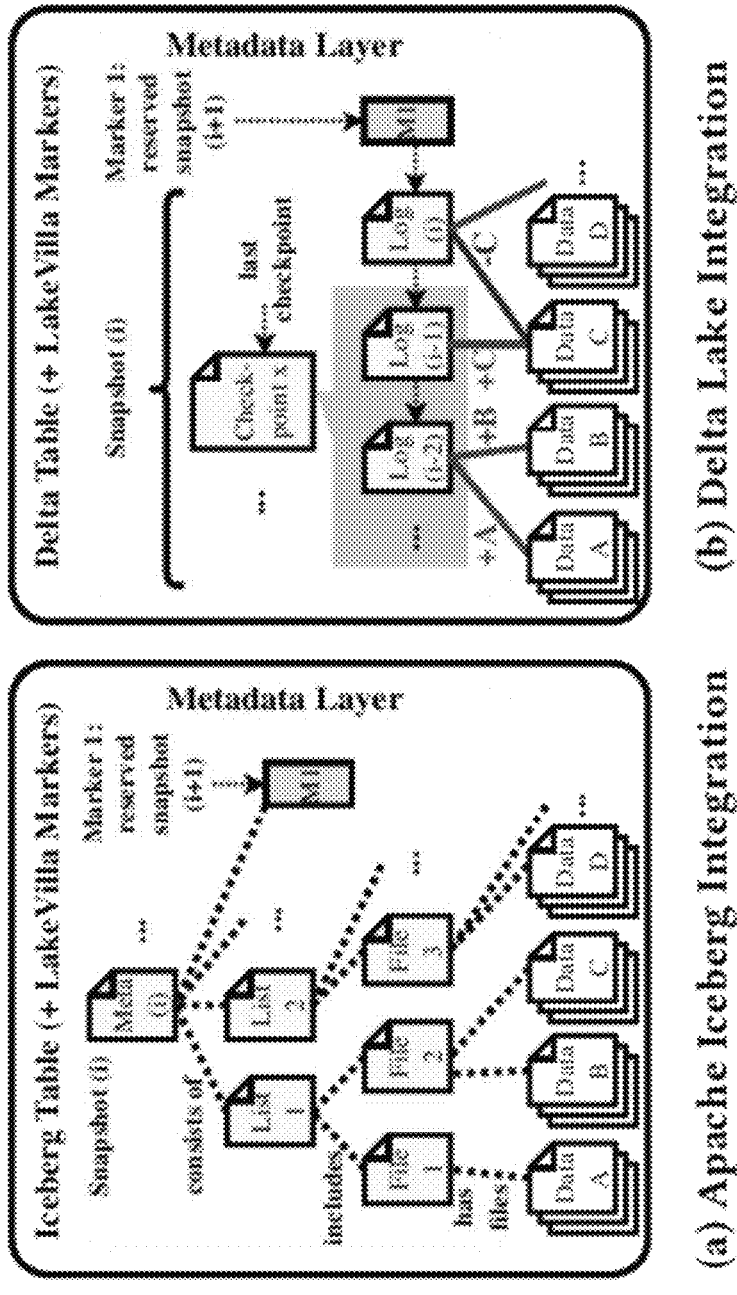
FIG. 5 illustrates examples of marker integration, in accordance with some example implementations of the current subject matter.

Referring now to FIG. 5, examples of marker integration are depicted, in accordance with one or more embodiments of the current subject matter. The placement of markers shown in FIG. 5 is not arbitrary. In Iceberg, markers are placed in the area of manifest lists and link to the snapshot. For Delta Tables, markers are appended to the log directory. Both approaches are shown in FIG. 5*a* and FIG. 5*b* for marker 'M1' respectively. In both options, the marker effectively becomes an exclusive lock to prevent other transactions from claiming the same snapshot version (i+1).

Nevertheless, committed transactions should be atomically visible and not rely on the marker technique. So, a commit phase may be employed that replaces these markers. During a commit, the client collects and summarizes all relevant information according to the OTF's required instructions. If needed, the client builds some underlying structures, such as Iceberg's manifest lists, and finally overwrites the placed marker with all required instructions. This action effectively makes the whole transaction result available and does not disturb the protocol. In case of an abort, the marker is overwritten with an empty manifest list or log entry (tombstone).

Figure 6:
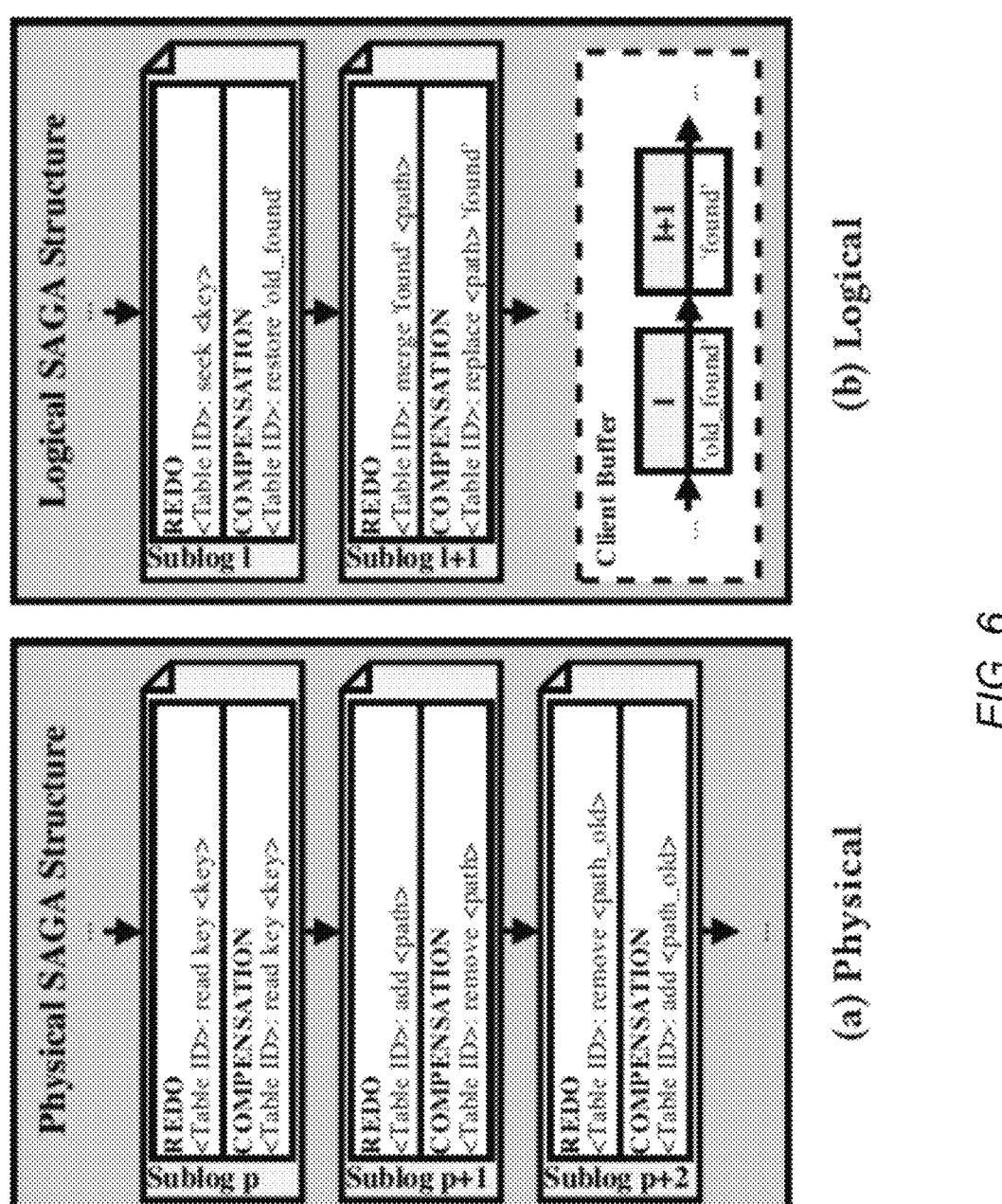
FIG. 6 illustrates examples of physical and logical SAGA structures, in accordance with some example implementations of the current subject matter.

Turning now to FIG. 6, examples of physical and logical SAGA structures are depicted, in accordance with one or more embodiments of the current subject matter. The SAGA Structure is the second technique (i.e., Technique #2) for enabling multi-table and multi-query transactions in data LHs. The second technique adapts the SAGA pattern to object stores. After introducing the locking system with markers in technique #1, technique #2 focuses on transaction recovery. Technique #2 defines a structure of sublogs in a separate working directory with redo and compensation steps for each transaction step. Such a structure enables undos and redos within a transaction to any point in time. The contained redo and compensation steps may be adapted to file-based operations and set into the LH context. FIG. 6 shows the generated sublogs in the physical and logical OTF definition for the query "UPDATE <Table ID> SET . . . WHERE key=<key>".

Physical SAGA instructions describe the explicit changes made to the previous table state, such as adding and removing files. Physical SAGA instructions can be compared to the log entries of implicit OTF designs (e.g., Delta Tables). An example of a physical SAGA instruction for the above query is shown in FIG. 6a. Each instruction references the table by an ID and uses a specific keyword to identify the instruction's operation. The corresponding compensation step is stored directly after a separator character. The first instruction in FIG. 6a reads the file with the specified key <key>, resulting in the physical path of the found data file <path_old> and the file's contents. The respective compensation step simply repeats this operation, as the redo operation does not change the overall table state. For the next step, the client uploads the new data file under the newly generated path <path> and defines the new data file's removal for the compensation step. Lastly, the transaction removes the old data file at <path_old> and adds it for compensation.

Logical SAGA instructions log the operation logic and try to greedily apply the explicit changes as much as possible. In an example, a design may see blind appends to a table as non-conflicting. A client will generate the file and add a physical SAGA instruction, even in a logical SAGA structure. In contrast, updates depend on previous transactions and are encoded logically. The logical encoding of an example update query is shown in FIG. 6b. The first SAGA instruction defines the search of the current file with the given <key> and stores the result in the client's buffer. The respective compensation step logs the old value of the buffer "old_found" to restore the old buffer state. The second SAGA instruction references the current buffer value "found" and merges the referenced file with a new file at <path> to generate the updated version. For compensation, the new file may be replaced at <path> with the original file. A client must ensure that all logical SAGA instructions are executed in order before a transaction's commit.

Undos and Redos are the operations utilizing the sublogs of a transaction. An undo traverses the sublog structure from the newest to the oldest sublog, executing the compensation steps to restore previous states. For the example in FIG. 6, the undo effectively restores the transaction state before the update in both logging versions. For the physical instructions, the undo adds the old file at <path_old> and removes the updated file at <path> (compensation steps p+1 & p+2). Furthermore, the undo mechanism can choose to execute physical reads such as compensation step p. The logical version starts by replacing <path> with the path stored in its buffer (compensation step 1+1). Internally, this is implemented through the removal of <path> and the addition of the file at the buffered path. Lastly, the old buffer value <old_key> may be stored in the client's buffer for the next undo instructions (compensation step 1). In contrast to undo, redo operations traverse the sublog structure from the oldest to the newest file, executing the redo steps. This effectively results in a client performing the same operations in the current setting.

Figure 7:
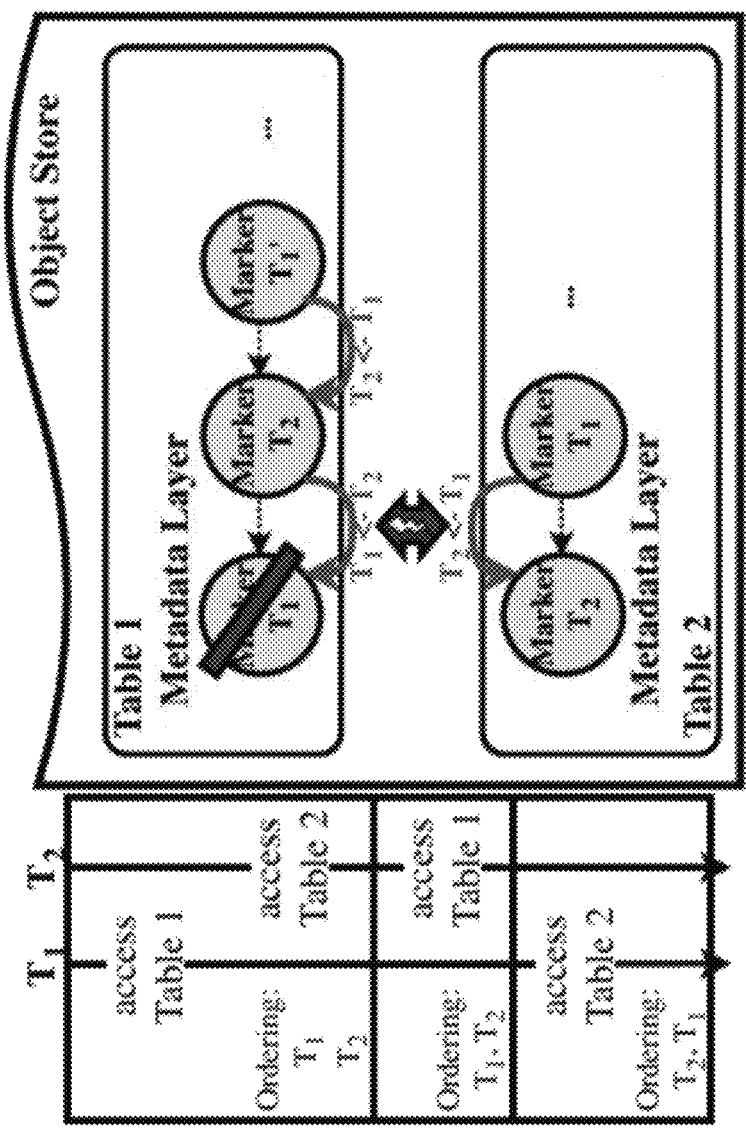
FIG. 7 illustrates an example of Marker-based Conflict and Deadlock Detection, in accordance with some example implementations of the current subject matter.

Referring now to FIG. 7, an example of Marker-based Conflict and Deadlock Detection is depicted, in accordance with one or more embodiments of the current subject matter. While a table-level lock and recovery can prevent conflicts and dependencies within the table (techniques #1 and #2), dependencies between tables still cannot be captured. For multiple tables, a deadlock may be encountered or inconsistencies may be caused when placing more markers into these tables. Global dependencies may be tracked by introducing a novel deadlock and conflict detection by extending the markers (technique #1) with known dependencies. The novel deadlock and conflict detection strategy presented herein is referred to as Technique #3.

An example strategy is illustrated with the example depicted in FIG. 7. Transactions T1 and T2 start working on different tables and place their markers in the respective metadata layer. The global ordering of these transactions during that time frame is concurrent and unrelated. After a while, T2 requests access to Table 1 and T2 places its marker behind T1's marker. When initializing the new marker and accessing the table state, T2 recognizes that T1's marker precedes its own. As this relation does not violate its own observed dependencies, T2 does not abort. T2 updates all its lists of accessed tables by overwriting each marker in the accessed tables. The global ordering between the transactions is then T1 before T2. Later, T1 requests access to table 2, T1 places its marker in the metadata layer of table 2, and T1 checks for predecessors. T1 detects T2's marker and retrieves its data. T1 compares the opened tables with T2's list and checks for potential deadlocks and conflicts. Because T2 also lists table 1 as accessed and T1 is not aware of the ordering T2<–T1, T1 concludes that a deadlock might occur. Hence, T1 frees its old marker in Table 1 by overwriting the old marker with an empty manifest/log and places a new marker "Marker T1" into the respective metadata layer. After confirming that the dependencies match (also possibly readjusting some changes in Table 1), T1 continues its operation. If T2 decides to access another table and finds a conflict contradicting its internal observations, T2 will reevaluate this observation. Here, T2 checks the origin of this observation (here: Table 1) if the situation changes. Depending on the result, T2 updates its internal observations or solves the conflict.

It is possible that this strategy might result in an abort when freeing the markers, which can be addressed with a complete transaction restart with the already acquired markers by using technique #2. Like technique #1, the standard commit overwrites all markers with their respective changes.

Figure 8:
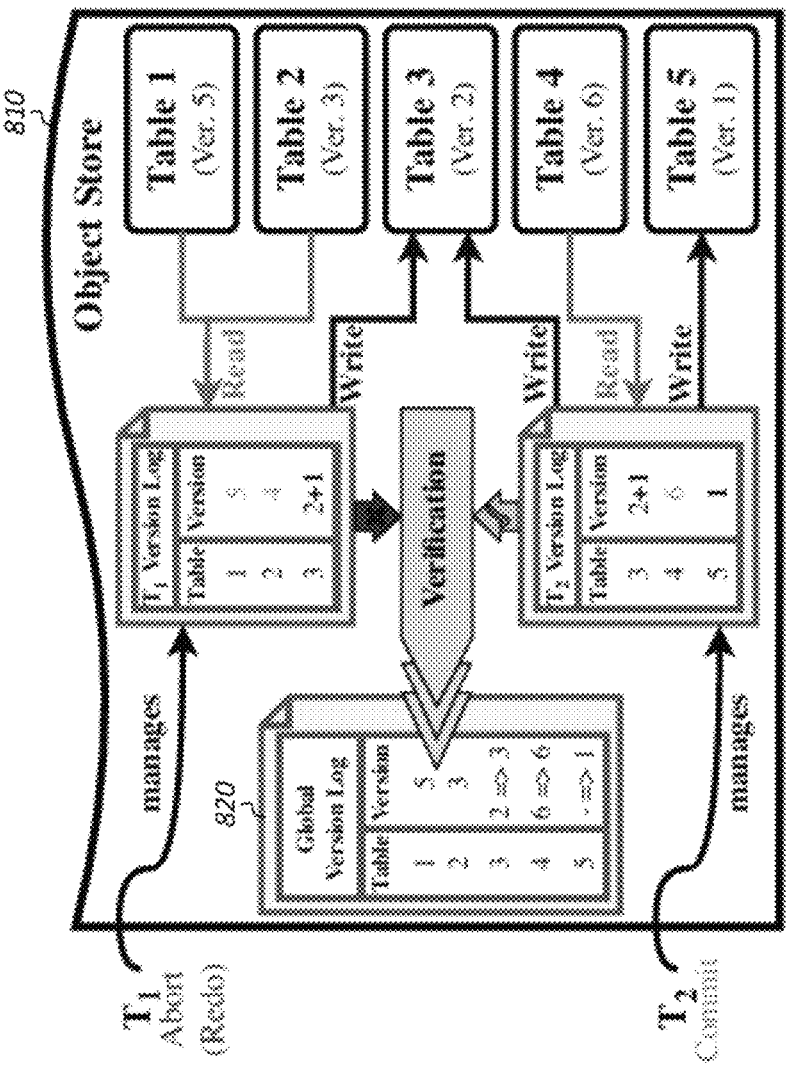
FIG. 8 illustrates an example of a global version log, in accordance with some example implementations of the current subject matter.

Turning now to FIG. 8, an example of a global version log is depicted, in accordance with one or more embodiments of the current subject matter. After introducing techniques #1-3 to reserve snapshots, recover, and detect global deadlocks, technique #4 includes a novel global layer which may be defined for object stores, with the novel global layer managing all the table snapshot versions to globally enable Multi-Version Concurrency Control-like (MVCC-like) behavior. This may be referred to as a file-based layer global version log, with the file-based layer global version log summarizing all tables' most recent valid versions. Hence, this technique removes the need for transactions to either explicitly or implicitly retrieve their version from each table separately and provides more control over tracking global relations and their dependencies. By moving the version assignment to a global design, snapshot versions can be advanced atomically to guarantee isolation between concurrent transactions.

In an example, a new global version log 820 handles all table versions. If a client accesses a table, the client first reads the global version log 820 and retrieves its global snapshot with a single GET request. Afterward, the client is bound to the versions received and can only use table versions that are equal to or smaller than the specified version. The example in FIG. 8 shows a global version log 820 that tracks 4 tables and their newest snapshot versions. T1 and T2 both start their execution and retrieve the version combination (Table 1, Ver. 5), (Table 2, Ver. 3), (Table 3, Ver. 2), and (Table 4, Ver. 6) from the global version log.

The global version log 820 introduces a file-based validation phase for the commit that checks the transaction's compatibility with the current global version, similar to MVCC. If the validation is successful, a transaction executes the table-level commit of each accessed table before atomically announcing the new snapshots. The validation of a transaction starts by checking and copying the transaction's own version changes to a shared key on the object store 810. If the transaction succeeds (by checking if a concurrent operation did not overwrite this file), it proceeds by reading the most recent global version log 820. Afterward, the transaction iterates over its own transaction version log and compares the version numbers. A read suboperation is compatible if the read suboperation's own version equals the global log. However, write suboperations increase the version in the transaction log. Those entries are only compatible if the difference between the old version and the proposed one equals the number of changes the transaction performed. Tables not accessed or newly created are not contained in either the global version log 820 or the transaction log. Both scenarios are automatically compatible and append more information to the global version log 820 during the commit. As an additional optimization, a rule is introduced that read-only transactions are compatible with lower list values or can even skip the version comparison. A transaction is considered compatible if all of the transaction's operations are confirmed compatible with the global version log 820 during validation.

In the example of FIG. 8, T1 reads tables 1 and 2 and writes to table 3, while T2 reads table 4, writes to table 3, and creates table 5. Their respective transaction logs contain the current version of the read tables and the targeted versions of the written tables. Both transactions initiate validation and try to copy their transaction log to the shared path. In this example, T1 loses and must abort or recover. T2 continues by comparing the global version log 820 and its transaction log. As Tables 1 and 2 were not accessed by T2, they are automatically compatible with the transaction's changes. The read of Table 4 states the same version as the global version log 820, so the read of Table 4 is compatible. The write set contains Table 3's referenced version 3 (2+1) and Table 5 at version 1. Both changes are compatible, claiming higher versions as tracked in the global version log 820. Hence, T2 is compatible and is staged for commit. T2 triggers individual commits in all tables and updates the global version log 820. After every individual commit operation is successful, the transaction deletes its copy in the shared transaction log directory to enable the next transaction validation. In contrast to compatible changes, the transaction must abort or trigger recovery mechanisms if validation fails and the transaction is considered incompatible.

Now that each individual technique has been described, a cumulative LakeVilla prototype is introduced. The cumulative LakeVilla prototype assembles the techniques to provide individual solutions for missing features: Level 0 enables recovery of transactions to concurrent changes (Techniques #1 and #2). Level 1 extends the transaction logic to support multi-table and multi-query operations (Techniques #1 and #3). Level 2 guarantees transaction isolation at all times (Technique #4). Each level is isolated, implying that a level can be applied without the upper or lower level. Furthermore, the LakeVilla prototype design can seamlessly apply to OTFs such as Apache Iceberg and Delta Lake without reformatting or reconfiguring the whole system. Each level is now discussed separately.

LakeVilla Level 0: Recovery—Markers to prevent starving. When operating with concurrent transactions, the key challenge to prevent aborts is adapting to changes in the snapshot versions of the metadata layer. By default, implicit and explicit metadata designs apply optimistic concurrency control that moves the checks for conflicts to the commit of a transaction. This approach assumes that most operations do not conflict. However, OTFs operate on the table level, meaning that all concurrent write operations on the same table will conflict without fine-grained conflict management. Hence, technique #1 may be used to reserve a snapshot ID at the start of the transaction and invalidate the snapshot ID in case of an abort. Furthermore, technique #2 provides more information for conflict resolution and partial adaption to concurrent changes.

Table-level conflict detection. To determine whether to commit or abort, LakeVilla Level 0 uses the markers placed in the metadata layer of a table. For concurrent transactions, the conflict detection triggers as soon as the marker of the preceding transaction is replaced. The corresponding client accesses the content of the new log and checks if the preceding transaction and its transaction changed the same files. If a conflict arises, recovery is implemented using the SAGA structure. Depending on the respective marker position, the SAGA logging type of a transaction may be adapted: A transaction uses physical instructions within its SAGA structure if it doesn't observe any preceding marker during its placement in the metadata layer and logical instructions otherwise. On commit, physical instructions can be applied directly, while logical instructions must be redone during commit. This mixture of techniques #1 and #2 enables higher throughput in the metadata layer and transforms markers from resembling exclusive locks to shared locks.

LakeVilla Level 1: Complex Transactions—Multi-Query and Multi-Table Transactions in Lakehouses. Building upon LakeVilla Level 0, multi-query and multi-table transactions may be implemented for LHs. For multi-query transactions on the same table, the marker idea (technique #1) may be reused but the marker model may be extended with technique #3. Like before, LakeVilla holds a marker to lock a table until the entire multi-query transaction is processed and overwrites with a real manifest/log to unlock. Unfortunately, re-applying the marker idea only partially implements complex transactions as multi-table transactions break global dependencies due to the independent metadata layers for all OTF tables. The metadata layer of one table would not be able to recognize any dependencies between tables, thereby enabling inconsistencies, deadlocks, and partial aborts. To avoid these problems, a transaction must announce its global presence and check table compatibility. LakeVilla Level 1 exposes this information by allowing an in-flight transaction to claim access to new tables with multiple markers and using marker-based conflict detection. If a client detects a deadlock, the client resolves the issues as specified by technique #3. Furthermore, a commit triggers all table-level commits required for a transaction by replacing all markers and commits globally when the transaction is successful in all tables.

LakeVilla Level 2: Isolation—the need for a global Lakehouse Layer. To completely guarantee isolation for any transaction, changes made by a transaction must become available simultaneously on a global scale. As discussed earlier, working with table-level metadata layers in current Lakehouse designs cannot guarantee simultaneous commits on multi-table OTF setups. Therefore, a global layer may be introduced that manages commits and global dependencies (technique #4). This change guarantees globally consistent versions at all times. Furthermore, LakeVilla Level 2 implements steps from MVCC-like version assignment and validation on the object store. This approach minimizes cost and avoids slow requests like LIST to the object store.

Modified reads and writes—A write transaction follows the proposed strategy of technique #4. The write transaction retrieves a globally consistent version by reading the global version log and executes all operations independently. On commit, the transaction validates its changes and atomically updates the global version log. If the changes are incompatible, the write transaction triggers recovery mechanisms (e.g., technique #2) or must abort. For read transactions to retrieve globally consistent versions, the read transactions read the global version log and skip the snapshot assignment from their original OTF protocol. This effectively reduces the number of requests to the metadata layers of single tables and replaces expensive requests (e.g., LIST for implicit designs).

Referring now to FIG. 9, a diagram illustrating an example of a system 900 is depicted, in accordance with one or more embodiments of the current subject matter. In system 900, clients may store data in an open format in an object store. Also, system 900 may implement LakeVilla, an extension that implements three missing features in composable levels. In an example, feature 0 supports complex transactions by implementing a conflict and deadlock detection model between all tables. The conflict and deadlock detection model uses markers (e.g., $M_0$, $M_1$, $M_2$) to create a global ordering between concurrent transactions. Feature 1 supports recovery by implementing logical snapshot version markers with transaction sublogs and physical and logical undo and redo information to define a greedy transaction model. The markers point to a subdirectory structure that enables reverting changes to earlier point-in-times of an ongoing transaction. The markers and the sublogs are stored in the OTF metadata layers 920A-920B of tables A and B, respectively. Feature 2 supports isolation by introducing a global version log 910 that checks global relations between tables and acts as a global layer on the object store.

System 900 implements the previously described features to address the challenges of supporting multi-table, multi-query transactions that exist in the existing systems. Each client may utilize these features on a feature-by-feature basis. However, clients are not required to utilize the features when accessing the data in the object store. As shown, client $C_0$ implements features 0, 1, and 2, and client $C_0$ interacts with the object store through the file-based global version log 910. Also, client $C_1$ implements features 0 and 2, and client $C_1$ interacts with the object store through the file-based global version log 910. On the other hand, client $C_2$ implements only feature 1, and client $C_2$ bypasses the file-based global version log 910 and interfaces directly with the data in the object store.

Turning now to FIG. 10, a process for determining which levels to apply to a query targeting a data lakehouse is depicted, in accordance with one or more embodiments of the current subject matter. At the beginning of the process, a transaction targeting a data lakehouse employing an open table format (OTF) is detected (block 1005). In an example, the transaction targets a plurality of tables and the transaction includes a plurality of queries. In other examples, the transaction may target only a single table and/or the transaction may include only a single query. Next, a database execution engine (e.g., database execution engine 250 of FIG. 2) determines which OTF enhancement levels to apply to the transaction (block 1010). In an example, the OTF enhancement levels include a first OTF enhancement level which utilizes markers to reserve snapshot versions, store information about in-flight transactions, and block concurrent operations from claiming a same snapshot version. The first OTF enhancement level also defines a structure of sublogs with redo and compensation steps for each transaction step. The OTF enhancement levels also include a second OTF enhancement level which utilizes markers to reserve snapshot versions, store information about in-flight transactions, and block concurrent operations from claiming a same snapshot version. The second OTF enhancement level also activates a marker-based conflict and deadlock detection model between a plurality of tables of the targeted database. The OTF enhancement levels also include a third OTF enhancement level which implements a global layer that manages a plurality of table snapshot versions to globally enable multi-version concurrency control. The third OTF enhancement level also implements a global version log which summarizes most recent valid versions of the plurality of tables.

The database execution engine has the flexibility to utilize different OTF enhancement levels for different queries. For example, the database execution engine may utilize a first OTF enhancement level for a first transaction, the database execution engine may utilize a second OTF enhancement level for a second transaction, the database execution engine may utilize a third OTF enhancement level for a third transaction, the database execution engine may utilize the first and third OTF enhancement levels for a fourth transaction, the database execution engine may utilize the second and third OTF enhancement levels for a fifth transaction, the database execution engine may utilize none of the OTF enhancement levels for a sixth transaction, and so on. In other words, the database execution engine is able to mix and match different combinations of OTF enhancement levels for different queries based on the way the OTF enhancement levels are constructed to allow for these OTF enhancement levels to be applied or not to be applied on a transaction-by-transaction basis.

If the database execution engine determines to apply the first OTF enhancement level to the transaction (conditional block 1015, "yes" leg), then the database execution engine applies the first OTF enhancement level to the transaction by utilizing markers to reserve snapshot versions, store information about in-flight transactions, and block concurrent operations from claiming a same snapshot version (block 1020). The database execution engine also applies the first OTF enhancement level to the transaction by defining a structure of sublogs with redo and compensation steps for each transaction step (block 1025).

If the database execution engine determines to apply the second OTF enhancement level to the transaction (conditional block 1030, "yes" leg), then the database execution engine applies the second OTF enhancement level to the transaction by utilizing markers to reserve snapshot versions, store information about in-flight transactions, and block concurrent operations from claiming a same snapshot version (block 1035). The database execution engine also applies the second OTF enhancement level to the transaction by activating a marker-based conflict and deadlock detection model between a plurality of tables of the data lakehouse (block 1040).

If the database execution engine determines to apply the third OTF enhancement level to the transaction (conditional block 1045, "yes" leg), then the database execution engine applies the third OTF enhancement level to the transaction by implementing a global layer that manages a plurality of table snapshot versions to globally enable multi-version concurrency control (block 1050). The database execution engine also applies the second OTF enhancement level to the transaction by activating a marker-based conflict and deadlock detection model between a plurality of tables in the data lakehouse (block 1055).

Next, the database execution engine causes the transaction to be processed with any of the OTF enhancement levels that have been determined to be applied to the transaction (block 1060). Then, the database execution engine returns a result of the transaction processing to a computing device of a requesting client (block 1065). After block 1065, method 1000 may end.

Referring now to FIG. 11, a process for implementing nested metadata layers in an object store is depicted, in accordance with one or more embodiments of the current subject matter. An object store implements nested metadata layers, where the nested metadata layers include at least a global metadata layer (e.g., global version log 910 of FIG. 9) and table metadata layer(s) (e.g., metadata layers 920A-920B) (block 1105). For each transaction targeting data in the object store, a control unit (e.g., control unit 270 of FIG. 2) determines whether the transaction interacts with each metadata layer of the nested metadata layers (block 1110). For transactions that need to ensure global consistency, the control unit will cause the transactions to traverse the global metadata layer, where the global metadata layer includes a global version log for maintaining global consistency (block 1115). For transactions that need to maintain a global ordering between concurrent transactions, the control unit will cause the transactions to traverse the table metadata layer of each table being accessed, where the table metadata layer includes markers to create the global ordering and sublogs to enable undo and redo operations (block 1120). The control unit will cause other transactions to circumvent the global metadata layer and/or the table metadata layer on a transaction-by-transaction basis (block 1125). After block 1125, method 1100 may end.

Figure 12A:
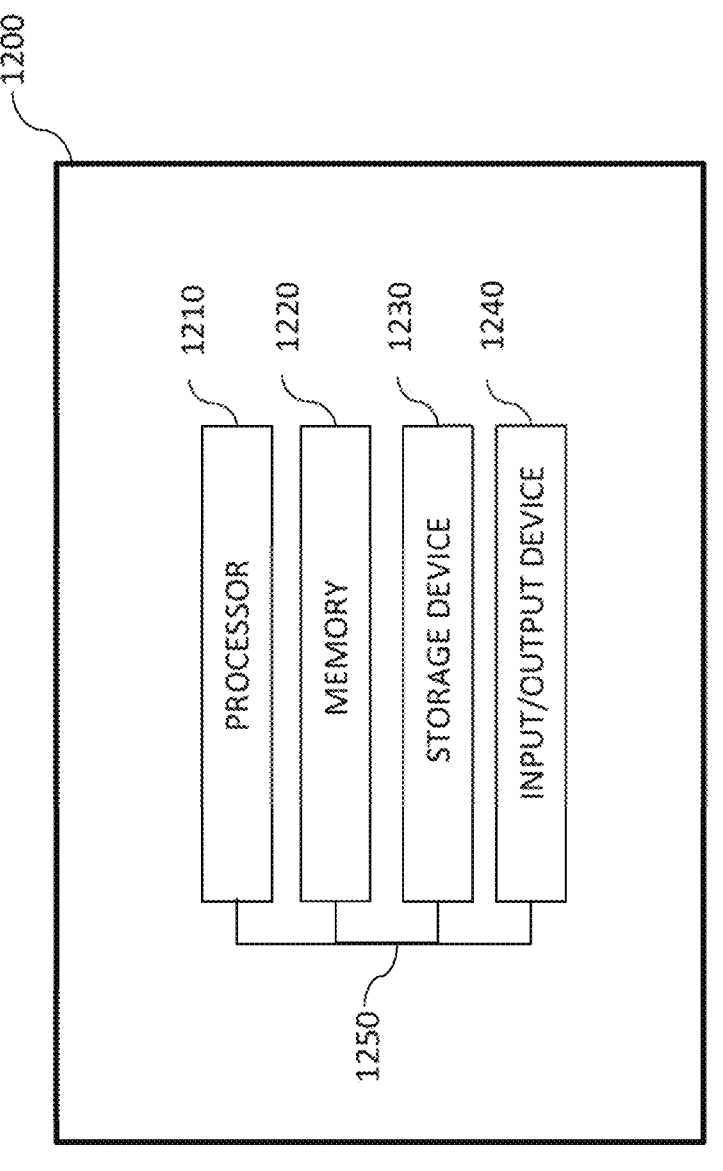
FIG. 12A depicts an example of a system, in accordance with some example implementations of the current subject matter.

In some implementations, the current subject matter may be configured to be implemented in a system 1200, as shown in FIG. 12A. The system 1200 may include a processor 1210, a memory 1220, a storage device 1230, and an input/output device 1240. Each of the components (e.g., the processor 1210, the memory 1220, the storage device 1230, the I/O device 1240) may be interconnected using a system bus 1250. The processor 1210 may be configured to process instructions for execution within the system 1200. In some implementations, the processor 1210 may be a single-threaded processor. In alternate implementations, the processor 1210 may be a multi-threaded processor. The processor 1210 may be further configured to process instructions stored in the memory 1220 or on the storage device 1230, including receiving or sending information through the input/output device 1240. The memory 1220 may store information within the system 1200. In some implementations, the memory 1220 may be a computer-readable medium. In alternate implementations, the memory 1220 may be a volatile memory unit. In yet some implementations, the memory 1220 may be a non-volatile memory unit. The storage device 1230 may be capable of providing mass storage for the system 1200. In some implementations, the storage device 1230 may be a computer-readable medium. In alternate implementations, the storage device 1230 may be a floppy disk device, a hard disk device, an optical disk device, a tape device, non-volatile solid state memory, or any other type of storage device. The input/output device 1240 may be configured to provide input/output operations for the system 1200. In some implementations, the input/output device 1240 may include a touchscreen display capable of displaying graphical user interfaces.

Figure 12B:
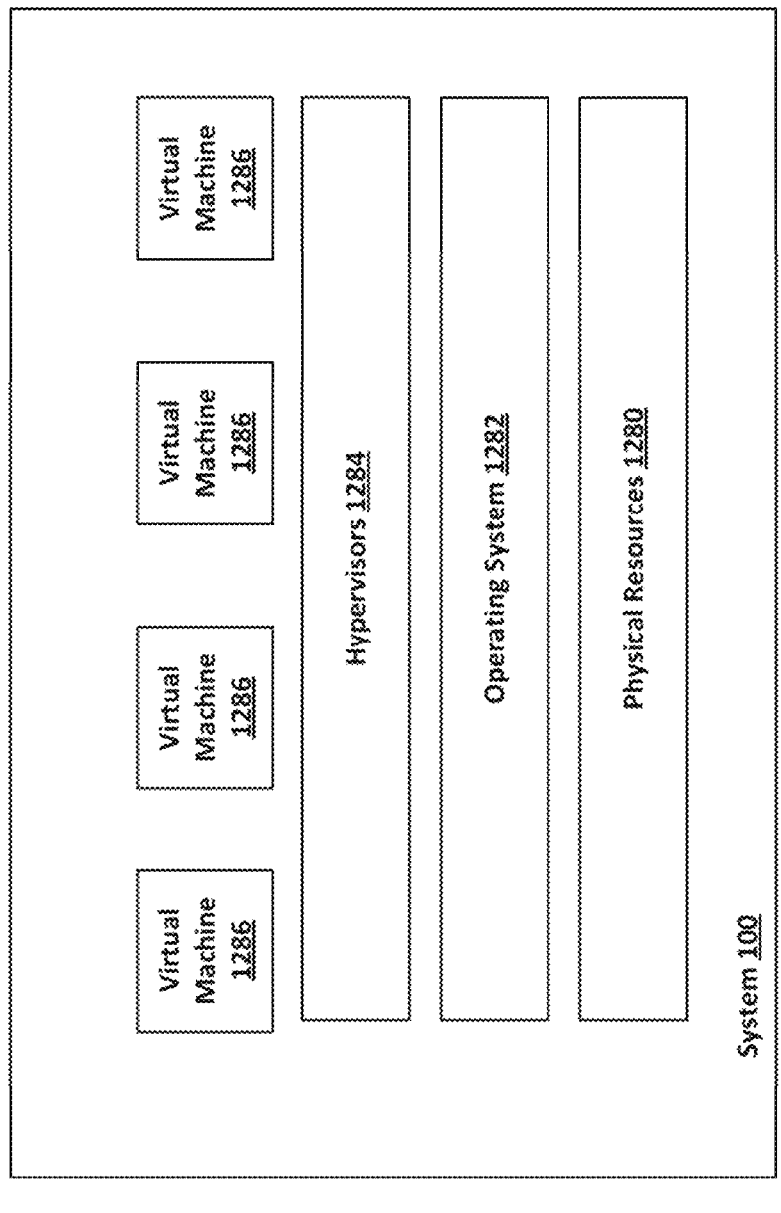
FIG. 12B depicts another example of a system, in accordance with some example implementations of the current subject matter.

FIG. 12B depicts an example implementation of the system 100 (of FIG. 1). The system 100 may be implemented using various physical resources 1280, such as at least one or more hardware servers, at least one storage, at least one memory, at least one network interface, and the like. The system 100 may also be implemented using infrastructure, as noted above, which may include at least one operating system 1282 for the physical resources 1280 and at least one hypervisor 1284 (which may create and run at least one virtual machine 1286). For example, each multitenant application may be run on a corresponding virtual machine 1286.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable storage medium" refers to any computer program product, apparatus and/or device, such as for example magnetic discs, optical disks, memory, and Programmable Logic Devices (PLDs), used to provide machine instructions and/or data to a programmable processor, including a machine-readable storage medium that receives program instructions as a machine-readable signal. The term "machine-readable signal" refers to any signal used to provide machine instructions and/or data to a programmable processor. The machine-readable storage medium can store such program instructions non-transitorily, such as for example as would a non-transient solid state memory or a magnetic hard drive or any equivalent storage medium. The machine-readable storage medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system comprising: at least one processor; and at least one memory storing instructions that, when executed by the at least one processor, cause operations comprising: detecting a transaction targeting an object store employing an open table format (OTF); determining which OTF enhancements levels of a plurality of OTF enhancement levels to apply to the transaction; applying one or more OTF enhancement levels to the transaction based on the determining; causing the transaction to be processed with the applied one or more OTF enhancement levels; and returning a result of the transaction processing to a computing device.

Example 2: The system of Example 1, wherein applying a first OTF enhancement level comprises: utilizing markers to reserve snapshot versions, store information about in-flight transactions, and block concurrent operations from claiming a same snapshot version; and defining a structure of sublogs with redo and compensation steps for each transaction step.

Example 3: The system of any of Examples 1-2, wherein applying a second OTF enhancement level comprises: utilizing markers to reserve snapshot versions, store information about in-flight transactions, and block concurrent operations from claiming a same snapshot version; and activating a marker-based conflict and deadlock detection model between a plurality of tables of the object store.

Example 4: The system of any of Examples 1-3, wherein applying a third OTF enhancement level comprises implementing a global layer that manages a plurality of table snapshot versions to globally enable multi-version concurrency control.

Example 5: The system of any of Examples 1-4, wherein applying the third OTF enhancement level further comprises implementing a global version log which summarizes most recent valid versions of the plurality of tables.

Example 6: The system of any of Examples 1-5, wherein each OTF enhancement level may be applied independently of other ones of the plurality of OTF enhancement levels.

Example 7: The system of any of Examples 1-6, wherein applying the first OTF enhancement level further comprises storing a first marker in a metadata layer while the first transaction is in-flight.

Example 8: The system of any of Examples 1-7, wherein the operations further comprise converting the first marker into a structure within the metadata layer during a commit of the first transaction.

Example 9: The system of any of Examples 1-8, wherein the transaction targets a plurality of tables.

Example 10: The system of any of Examples 1-9, wherein the transaction comprises a plurality of queries.

Example 11: A computer-implemented method comprising: detecting a transaction targeting an object store employing an open table format (OTF); determining which OTF enhancements levels of a plurality of OTF enhancement levels to apply to the transaction; applying one or more OTF enhancement levels to the transaction based on the determining; causing the transaction to be processed with the applied one or more OTF enhancement levels; and returning a result of the transaction processing to a computing device.

Example 12: The computer-implemented method of Example 11, wherein applying a first OTF enhancement level comprises: utilizing markers to reserve snapshot versions, store information about in-flight transactions, and block concurrent operations from claiming a same snapshot version; and defining a structure of sublogs with redo and compensation steps for each transaction step.

Example 13: The computer-implemented method of any of Examples 11-12, wherein applying a second OTF enhancement level comprises: utilizing markers to reserve snapshot versions, store information about in-flight transactions, and block concurrent operations from claiming a same snapshot version; and activating a marker-based conflict and deadlock detection model between a plurality of tables of the object store.

Example 14: The computer-implemented method of any of Examples 11-13, wherein applying a third OTF enhancement level comprises implementing a global layer that manages a plurality of table snapshot versions to globally enable multi-version concurrency control.

Example 15: The computer-implemented method of any of Examples 11-14, wherein applying the third OTF enhancement level further comprises implementing a global version log which summarizes most recent valid versions of the plurality of tables.

Example 16: The computer-implemented method of any of Examples 11-15, wherein each OTF enhancement level may be applied independently of other ones of the plurality of OTF enhancement levels.

Example 17: The computer-implemented method of any of Examples 11-16, wherein applying the first OTF enhancement level further comprises storing a first marker in a metadata layer while the first transaction is in-flight.

Example 18: The computer-implemented method of any of Examples 11-17, further comprising converting the first marker into a structure within the metadata layer during a commit of the first transaction.

Example 19: The computer-implemented method of any of Examples 11-18, wherein the transaction targets a plurality of tables, and wherein the transaction comprises a plurality of queries.

Example 20: A non-transitory computer readable storage medium storing instructions, which when executed by at least one data processor, result in operations comprising: detecting a transaction targeting an object store employing an open table format (OTF); determining which OTF enhancements levels of a plurality of OTF enhancement levels to apply to the transaction; applying one or more OTF enhancement levels to the transaction based on the determining; causing the transaction to be processed with the applied one or more OTF enhancement levels; and returning a result of the transaction processing to a computing device.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A system comprising:

at least one processor; and at least one memory storing instructions that, when executed by the at least one processor, cause operations comprising:

detecting a transaction targeting an object store employing an open table format (OTF);

determining which one or more OTF enhancements levels of a plurality of OTF enhancement levels to apply to the transaction, wherein the plurality of OTF enhancement levels comprise a first OTF enhancement level, a second OTF enhancement level, and a third OTF enhancement level, each of which comprises a unique set of OTF enhancements;

applying the one or more OTF enhancement levels to the transaction based on the determining;

causing the transaction to be processed with the applied one or more OTF enhancement levels; and returning a result of the transaction processing to a computing device, wherein applying the first OTF enhancement level comprises:

utilizing markers to reserve snapshot versions, store information about in-flight transactions, and block concurrent operations from claiming a same snapshot version, and defining a structure of sublogs with redo and compensation steps for each transaction step;

wherein applying the second OTF enhancement level comprises:

utilizing markers to reserve snapshot versions, store information about in-flight transactions, and block concurrent operations from claiming a same snapshot version, and activating a marker-based conflict and deadlock detection model between a plurality of tables of the object store; and wherein applying the third OTF enhancement level comprises:

implementing a global layer that manages a plurality of table snapshot versions to globally enable multiversion concurrency control.

2. The system of claim 1, wherein applying the third OTF enhancement level further comprises implementing a global version log which summarizes most recent valid versions of the plurality of tables.

3. The system of claim 2, wherein the one or more OTF enhancement levels are applied independently of other ones of the plurality of OTF enhancement levels.

4. The system of claim 3, wherein applying the first OTF enhancement level further comprises storing a first marker in a metadata layer while the first transaction is in-flight.

5. The system of claim 4, wherein the operations further comprise converting the first marker into a structure within the metadata layer during a commit of the first transaction.

6. The system of claim 1, wherein the transaction targets a plurality of tables.

7. The system of claim 1, wherein the transaction comprises a plurality of queries.

8. A computer-implemented method comprising:

detecting a transaction targeting an object store employing an open table format (OTF);

determining which one or more OTF enhancements levels of a plurality of OTF enhancement levels to apply to the transaction, wherein the plurality of OTF enhancement levels comprise a first OTF enhancement level, a second OTF enhancement level, and a third OTF enhancement level, each of which comprises a unique set of OTF enhancements;

applying the one or more OTF enhancement levels to the transaction based on the determining;

causing the transaction to be processed with the applied one or more OTF enhancement levels; and returning a result of the transaction processing to a computing device, wherein applying the first OTF enhancement level comprises:

utilizing markers to reserve snapshot versions, store information about in-flight transactions, and block concurrent operations from claiming a same snapshot version, and defining a structure of sublogs with redo and compensation steps for each transaction step;

wherein applying the second OTF enhancement level comprises:

utilizing markers to reserve snapshot versions, store information about in-flight transactions, and block concurrent operations from claiming a same snapshot version, and activating a marker-based conflict and deadlock detection model between a plurality of tables of the object store; and wherein applying the third OTF enhancement level comprises:

implementing a global layer that manages a plurality of table snapshot versions to globally enable multi-version concurrency control.

9. The computer-implemented method of claim 8, wherein applying the third OTF enhancement level further comprises implementing a global version log which summarizes most recent valid versions of the plurality of tables.

10. The computer-implemented method of claim 9, wherein the one or more OTF enhancement levels are applied independently of other ones of the plurality of OTF enhancement levels.

11. The computer-implemented method of claim 10, wherein applying the first OTF enhancement level further comprises storing a first marker in a metadata layer while the first transaction is in-flight.

12. The computer-implemented method of claim 11, further comprising converting the first marker into a structure within the metadata layer during a commit of the first transaction.

13. The computer-implemented method of claim 8, wherein the transaction targets a plurality of tables, and wherein the transaction comprises a plurality of queries.

14. A non-transitory computer readable storage medium storing instructions, which when executed by at least one data processor, result in operations comprising:

detecting a transaction targeting an object store employing an open table format (OTF);

determining which one or more OTF enhancements levels of a plurality of OTF enhancement levels to apply to the transaction, wherein the plurality of OTF enhancement levels comprise a first OTF enhancement level, a second OTF enhancement level, and a third OTF enhancement level, each of which comprises a unique set of OTF enhancements;

applying the one or more OTF enhancement levels to the transaction based on the determining;

causing the transaction to be processed with the applied one or more OTF enhancement levels; and returning a result of the transaction processing to a computing device, wherein applying the first OTF enhancement level comprises:

utilizing markers to reserve snapshot versions, store information about in-flight transactions, and block concurrent operations from claiming a same snapshot version, and defining a structure of sublogs with redo and compensation steps for each transaction step;

wherein applying the second OTF enhancement level comprises:

utilizing markers to reserve snapshot versions, store information about in-flight transactions, and block concurrent operations from claiming a same snapshot version, and activating a marker-based conflict and deadlock detection model between a plurality of tables of the object store; and wherein applying the third OTF enhancement level comprises:

implementing a global layer that manages a plurality of table snapshot versions to globally enable multi-version concurrency control.

* * * * *